United States Patent Office 2,776,272
Patented Jan. 1, 1957

2,776,272

FURFURAL-KETONE COMPOSITIONS OF MATTER AND METHODS OF MAKING SAME

Mortimer T. Harvey, South Orange, N. J., assignor to Harvel Research Corporation, a corporation of New Jersey No Drawing. Application April 1, 1952,
Serial No. 279,919

10 Claims. (Cl. 260—45.5)

This invention relates to novel compositions of matter and to methods for preparing them. In one of its more specific aspects, the invention is directed to combining styrene with furfural-ketone organic reaction products as well as such reaction products thickened or polymerized under acidic conditions. Said organic reaction products may be produced by reacting under alkaline conditions furfuraldehyde and a ketone having at least two hydrogen atoms on an alpha carbon, examples of which are acetone, diacetone alcohol, methyl ethyl ketone, acetonyl acetone, cyclohexanone, mesityl oxide, etc. I have discovered that novel and highly useful products having utility in a wide variety of different fields may be produced by combining styrene, which may be in either monomeric or polymeric state and preferably in the liquid condition, with one or a combination of two or more of said unthickened or thickened organic reaction products. The term styrene as employed in this application is meant to include monomeric styrene as well as polymers of styrene unless otherwise specifically indicated.

In one of its more specific aspects, the invention is directed to combining (I) styrene with (II) an organic reaction product which may be in the liquid, gelatinous or solid state and at 100° C. is liquid, and selected from the group consisting of (a) monofurfurylidene-ketone, (b) difurfurylidene-ketone, (c) organic reaction masses, said reaction masses having a viscosity of at least 50 cps. at 25° C. and produced by reacting under alkaline conditions furfuraldehyde and a ketone having at least two hydrogen atoms on an alpha carbon, (d) residual fractions of (c) measuring at least 60% by weight of (c) and obtained by the heat distillation of (c), (e) thickened or polymerized products produced by polymerizing or thickening (a)–(d) under acidic conditions, and (f) mixtures of two or more of products (a)–(e). The ratio by weight of (I) to (II) may vary over wide limits depending upon the ultimate use of the combination and may be in the ratio range of 5 parts of (I) to 95 parts of (II) to 95 parts of (I) to 5 parts of (II). These combinations may be employed alone as coating compositions or may be first thinned with a solvent and such solutions may be employed as a coating and/or impregnant, the thinner then being driven off leaving behind the combination to serve as an impregnant binder and protective coating. In addition, they may be combined with other materials such as various rubbery materials and other compositions to improve certain of their characteristics. They may be combined with asbestos, fillers, etc., molded and cured to provide friction elements such as brake linings and clutch facings.

According to this invention, styrene and any one or combination of two or more of products (II) may be placed in a vessel and, with or without the use of a catalyst in the relative proportions hereinbefore set forth, provide novel combinations. For copolymerization a catalyst and/or heat is generally required. The catalysts which are preferably employed are acidic agents such as diethyl sulphate, paratoluene sulphonic acid, boron trifluoride, potassium per-sulphate, mono butyl or propyl sulphate, etc., as well as peroxides such as benzoyl, hydrogen, tertiary butyl, peroxide or the like. I prefer to employ acidic catalysts when I copolymerize styrene and any one of the products (II) in the proportion of 100 parts by weight of styrene to 5-100 parts by weight of (II); and to employ peroxide catalysts when I copolymerize styrene with any one of products (II) in the proportion of 100 parts of (II) to 5-100 parts of styrene. In this manner, copolymerization may be affected on either the acid or alkaline side.

These novel combinations of styrene and (II) are characterized as being faster setting and drying, and when compared with styrene in the solid state are less brittle, and moreover the presence of (II) imparts a certain toughness to the styrene and reduces the extent of mono crazing thereof. Said novel combinations may be combined with rubbery materials such as natural rubber, rubbery polymers of chloroprene, rubbery polymers of butadiene, rubbery copolymers of butadiene and styrene, and rubbery copolymers of butadiene and acrylonitrile with the ratio by weight of the former to the latter being 5–100 parts of the former to 100 parts of the latter.

It is also within the purview of this invention to copolymerize butadiene with one or a combination of two or more of said products (II) with or without a simultaneous copolymerization of styrene. For this purpose 100 parts by weight of butadiene may be copolymerized with 5–40 parts by weight of any one or a combination of two or more of products (II) and 10–50 parts by weight of monomeric styrene. If desired, the styrene may be omitted to obtain copolymers of butadiene and product (II). In either case an aqueous solution of sodium oleate and benzoyl peroxide catalyst may be employed. All of the novel products thus produced when cured will be found to have increased ozone resistance when compared with such polymers or copolymers in the cured state and in the absence of product (II).

Prior to this invention, reaction products of furfuraldehyde and ketones had been made and known to the art. Various methods may be employed to produce all of them, these methods being known to the art and therefore the methods per se not being this invention. That is to say that the invention is not directed to the reaction masses per se or to the compounds per se produced by reacting furfuraldehyde and a ketone under alkaline conditions.

The furfuraldehyde-ketone reaction products may be prepared by employing any of the methods known to the art. One method which may be employed in the preparation of the starting materials is to first produce the reaction products. For this purpose, the furfuraldehyde and ketone are mixed with each other and then thereto is added a quantity of an alkaline material such as an aqueous solution of sodium hydroxide, potassium hydroxide, lime or the like. These three components are mixed with each other in an autoclave or closed unit and shortly after the mixture takes place an exothermic reaction occurs and the pressure within the autoclave will rise. This vigorous reaction is not easily controlled by ordinary methods, such as by using reacting units which have air vents through the top, because under such conditions many times there may be losses of some of the reaction products escaping through the air vents. For this reason, an autoclave is recommended as the reacting unit. After the exothermic reaction has subsided, the reaction is practically complete. In order to assure complete reaction and high yields, the mass in the autoclave is externally heated to maintain it in the state of boiling for a period of time depending upon the viscosity desired of the resultant reaction mass, which may vary from a thin liquid to a solid at room temperature. Generally, I prefer that the time of boiling is such that the viscosity of the reaction mass employed as a starting material when dehydrated is a liquid, that is, it is pourable at 25° C. and for some purposes at the present time no greater than approximately 20,000 cps. at 25° C. and in all cases no lower than 50 cps. at 25° C. This reaction provides compounds which are mono and di-furfurylidene ketones, having the following formula:

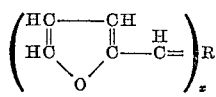

in which $x$ is a whole number selected from the group 1 and 2, and R is a ketone lacking two of the hydrogen atoms normally on either one or both of its alpha carbons. These compounds are produced as a result of reaction between the furfuraldehyde and ketone wherein two hydrogen atoms on the alpha carbons unite with the oxygen of the furfuraldehyde to split off water. This reaction also provides an amorphous or resinous material. The quantity of said resinous material present in the reaction mass varies and is dependent upon the time magnitude of boiling of the reaction mass and is approximately 5% or more of the reaction mass by weight and in general measures about 5%-60% by weight of the reaction mass.

Reference is hereby made to the United States Patent 2,363,829 which issued to myself and S. Caplan on Nov. 28, 1944, and disclosed a wide variety of furfuraldehyde-ketone reaction products and methods for making them, all of which may be employed herein.

The following Examples 1-3 are given merely to further illustrate the methods for providing some of the starting materials and are not to be construed in a limiting sense, all parts given being by weight unless otherwise indicated.

*Example 1*

Into a one-gallon pail is placed a quantity of sodium hydroxide weighing 2 lbs. 6 oz. There there is added thereto sufficient water to fill the pail and the sodium hydroxide in the water is stirred until the sodium hydroxide is completely dissolved therein. Then in a Monel metal lined autoclave are placed 40 lbs. of furfuraldehyde and 24 lbs. of acetone. This autoclave is preferably provided with a mechanical mixer or agitator which may be in the nature of a paddle mixer. The mixture is agitated and while in the state of agitation there is added thereto about ⅙ of the volume of said heretofore prepared aqueous solution of sodium hydroxide. With all the valves of the autoclave closed it will be noted that an exothermic reacton takes place in a very few minutes after the addition of the sodium hydroxide solution and the temperature of the mass continuously agitated by the stirrer will rise to approximately 150° F. in about three or four minutes. After about 10 minutes there is added to the mass in said autoclave another charge containing 40 lbs. of furfuraldehyde and 24 lbs. af acetone. Then to the mass in the autoclave there is added a second increment of said sodium hydroxide solution equal in volume to the first addition. After a few minutes the temperature of the mass will, due to the exothermic reaction, rise to approximately 165-170° F. The foregoing steps are repeated four more times so that the amount of furfuraldehyde and acetone added to the autoclave are equal to 240 lbs. and 144 lbs. respectively and all of the initially prepared aqueous solution of sodium hydroxide has been added. After the last addition of sodium hydroxide the temperature of the mass within the autoclave will have stabilized to about 180-195° F. Then the mass within the autoclave may be heated by means of a steam coil located therein and through a jacket carried thereby to maintain the temperature of the mass between approximately 185-190° F. for about 30 minutes in order to complete the reaction and to obtain high yields. The steam is cut off from the coil and jacket and then there is added thereto an aqueous solution of sulphuric acid in quantities sufficient to render the mass practically neutral. In this instance there may be added an aqueous solution of sulphuric acid consisting of 3 lbs. 3 oz. of water. Then this mass may be heated for about 5 minutes at a temperature between 175-200° F. to substantially completely neutralize the mass. The substantially neutral mass may then be substantially completely dehydrated by heating the same to a temperature of 220° F. with or without vacuum, yielding approximately 300 lbs. of dehydrated substantially neutral material known as product A, whose viscosity at 250 C. is 92 cps. and having a specific gravity at 25° C. of 1.150. When this material, product A, is distilled at a pressure of approximately .1 mm. of mercury pressure a fraction (37%) weighing approximately 110 lbs. comes off at temperatures in the range of 70-85° C. and is hereinafter known as fraction I, apparently essentially mono-furfurylidene-acetone leaving behind a residual fraction known as Product RFA, and a fraction (47%) measuring approximately 140 lbs. comes off in the temperature range of 150-165° C. and hereinafter is known as fraction II. The residue measuring approximately 50 lbs. is a brittle solid on cooling. Analysis of fraction I established a carbon content of 70.30% and hydrogen of 5.48% which corresponds to the carbon and hydrogen values of furfural acetone having the following formula:

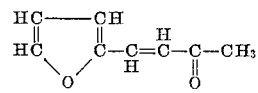

Analysis of fraction II established a carbon content of 73.07% and a hydrogen content of 4.53% corresponding to the carbon and hydrogen values of difurfural acetone having the following formula:

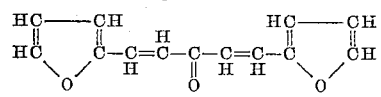

*Example 2*

By using the same procedure as that set forth in Example 1 and substituting 180 lbs. of methyl ethyl ketone for the 140 lbs. of acetone, I produced product B which may be distilled under low pressure conditions to provide fraction B-1 consisting essentially of monofurfurylidene-methyl ethyl ketone and leaving behind fraction RFB which may be distilled to provide fraction B-2 which is essentially difurfurylidene-ketone leaving behind a substatial portion of a resinous residue.

*Example 3*

By using the same procedure as that set forth in Example 2 and substituting 240 lbs. of diacetone alcohol for the 180 lbs. of methyl ethyl ketone, there may be produced an organic reaction mass known as product C as well as the monofurfurylidene-diacetone alcohol fraction known as C-1, a residual fraction known as RFC, another distillate fraction consisting essentially of difurfurylidene-diacetone alcohol known as C-2, as well as an ultimate resinous residue.

It is to be understood that substantially the same procedure as that set forth in the foregoing examples may be employed with any of the desired ketones or mixtures thereof to provide reaction masses, residual fractions, as well as the mono and di-ketone distillates.

All of these furfuraldehyde-ketone organic reaction products may be polymerized under acidic conditions to provide thickened or resinous compositions which are in the liquid state at 100° C. and when maintained at 300° F. for 24 hours will be found to be in the infusible state at the end of that period. In general, said organic reaction products, whether the reaction masses themselves, the particular mono or difurfurylidene-ketone compounds or residual fractions of said reaction masses, may all be polymerized under acidic conditions by adding an acidic agent thereto in quantity sufficient to lower the pH thereof to a value of approximately 1.5 and heating said mixture at 180–260° F. until the desired degree of polymerization has been attained.

The following are a number of illustrative examples of various combinations of styrene and (II), all parts given by weight unless otherwise specified.

Example 4

100 parts of product A, 100 parts of monomeric styrene and 5 parts of a solution consisting of equal parts of paratoluene sulphonic acid and alcohol are heated to approximately 115° C. whereupon a fairly smooth reaction occurs. The copolymerization of the styrene and product A is continued until the reaction mass is of desired viscosity which may vary depending upon what is desired. When the reaction mass of required viscosity is attained, a quantity of lime is added thereto for greatly increasing the pH and the heating is discontinued resulting in stopping of the continued reaction on the acid side. This mass may be thinned with a solvent such as alcohol, ketone, etc., and such solutions may be applied on to a surface of a base to coat and/or impregnate it, the solvent is driven off and then if desired heat curing is effected at around 150° C. Another method which may be employed is to take the mass which has been dissolved in the solvent and mix it with asbestos, cotton linters or the like. This mixture may then be formed and cured at elevated temperatures to provide a wide variety of products useful in a number of different arts.

Example 5

50 grams of monomeric styrene was mixed with 150 grams of a thickened or polymerized product produced by thickening product A with diethyl sulphate until its viscosity was approximately three times that of product A in the liquid state. Then into said mixture was added 5 grams of boron trifluoride in ether and the mixture agitated whereupon at room temperature an exothermic reaction coupling or copolymerization of the components takes place. The degree of coupling or copolymerization may be controlled by the addition of lime to neutralize the mass whereupon the stabilization of the reaction product is effected. This mass may be cured to the solid state in a short period by maintaining it at 150° C.

Example 6

There were mixed together 50 parts of monomeric styrene and 125 parts of a homogeneous mass consisting of product A, an oil soluble black known as "Calco Liquid Oil Black 9096" of Calco Division of American Cyanamide Co., and alcohol in the proportions of 5 lbs., 160 grams and 1 pound. Then throughout said mix was uniformly distributed 30 parts of a solution consisting of equal parts of paratoluene sulfonic acid and alcohol. This mass has a pot life of several days at room temperature, but when sprayed as a thin film on wood dries remarkably fast.

Example 7

20 parts of monomeric styrene, 2 parts of product A and 1 part of benzoyl peroxide were mixed together and the mix maintained at 150° C. to effect copolymerization. When the desired degree of copolymerization has been attained, heat is removed and the resultant mass may be thinned with a solvent such as toluol or even monomeric styrene and this may then be coated on paper, glass or cloth. The coated base may be dried by heating. Such thermoplastic coated bases may be employed as wrappings for coils, transformer coils, etc.

Example 8

5–50 parts of product A or acid polymerized A all being liquid at 100° C. and 100 parts of monomeric styrene were mixed together and, if desired, heated while agitated for about 5 minutes at 100° C. While hot, they may be spread on a base to be coated or impregnated and maintained under heating at 150° C. overnight or merely allowed to cool.

Example 9

100 grams of solid polystyrene and 10 grams of product A were maintained at 150° C. for 72 hours. At the end of that period, the mass was in the solid state and was much less brittle than a blank of only polystyrene under the same conditions.

Example 10

Employing the same procedure and materials as Example 4, but substituting products RFA, A–1, A–2, B, RFB, B–1, B–2, C, RFC, C–1 or C–2, or any of them polymerized under acidic conditions and having a viscosity of at least that of the corresponding unthickened product and all being liquid at 100° C., may be substituted for product A of Example 4. Thus, a number of highly useful products may be obtained. Still other products may be obtained by substituting liquid polymerized styrene or solid polymerized styrene for the monomeric styrene of this example.

The combination of styrene and one or more of said products (II) may be combined with one or more of said rubbery materials heretofore set forth and in the aforesaid proportions. This may be readily accomplished by employing a rubber mill or a dough mixer and such compositions when cured have greatly improved ozone resistance.

Example 11

100 parts of any one of said rubbery materials are milled on a rubber mill, and during milling there is added thereto 5–100 parts of a combination of styrene and (II) in any desired proportion and preferably in the copolymerized state and having the characteristic of being liquid or gelatinous but exhibiting flow at 100° C., examples of which are herein set forth. The milling is continued until uniform distribution has been obtained of said components and also of other components such as fillers, etc., which may be added. The resultant mass may be extruded directly on to electrical conductors or molded and subsequently cured and will be found to have good electrical resistance and enhanced ozone resistance.

Example 12

Make up an aqueous solution of sodium oleate containing 10% sodium oleate. Then to 750 parts of said aqueous solution in a closed vessel add individually or together 100 parts of liquid butadiene, 25 parts of monomeric styrene and 25 parts of A and 10 parts of benzoyl peroxide. Stir rapidly and hold to temperature of 35–100° C. for copolymerization. Then after the desired degree of copolymerization is obtained, it may be used as an emulsion or throw out by breaking emulsion with small amount of acetic acid.

If desired, the syrene may be omitted to obtain copolymerization of the butadiene and the particular product (II) employed.

Since certain changes in carrying out the aforesaid processes and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particu-

I claim:

1. A composition of matter comprising (I) styrene intimately combined with (II) an organic reaction product being liquid at 100° C. and selected from the group consisting of (a) monofurfurylidene-ketone, (b) difurfurylidene-ketone, (c) organic reaction masses produced by reacting under alkaline conditions furfuraldehyde and a ketone having two hydrogen atoms on an alpha carbon, said organic reaction masses having a viscosity of at least 50 cps. at 25° C., (d) residual fractions of (c) produced by the heat distillation of (c) and measuring at least 60% by weight of (c), and (e) polymerized products (a)–(d) produced by polymerizing (a)–(d) under acidic conditions.

2. A copolymer of the composition of matter defined in claim 1.

3. A composition of matter comprising (I) styrene intimately combined with (II) an organic reaction mass characterized by being in the liquid state at 100° C. and produced by reacting under alkaline conditions furfuraldehyde and a ketone having at least two hydrogen atoms on an alpha carbon, said organic reaction mass having a viscosity of at least 50 cps. at 25° C.

4. A composition of matter comprising (I) styrene intimately combined with (II) an organic reaction mass which was polymerized under acidic conditions and is in the liquid state at 100° C., said mass before said polymerization produced by reacting under alkaline conditions furfuraldehyde and a ketone having at least two hydrogen atoms on an alpha carbon and characterized by having a viscosity of at least 50 cps. at 25° C.

5. A composition of matter comprising (I) styrene and (II) difurfurylidene-ketone.

6. A composition of matter comprising (I) styrene intimately combined with (II) difurfurylidene-ketone which was thickened under acidic conditions and in the thickened state is liquid at 100° C.

7. A copolymer of (V) butadiene, (I) normally liquid styrene, and (II) a product liquid at 100° C. and selected from the group consisting of (a) monofurfurylidene-ketone, (b) difurfurylidene-ketone, (c) organic reaction masses produced by reacting under alkaline conditions furfuraldehyde and a ketone having two hydrogen atoms on an alpha carbon, said organic reaction masses having a viscosity of at least 50 cps. at 25° C., (d) residual fractions of (c) produced by the heat distillation of (c) and measuring at least 60% by weight of (c), and (e) polymerized products produced by polymerizing (a)–(d) under acidic conditions, the ratio by weight of (V) to (II) being 100 to 5–40 and the ratio by weight of (V) to (I) being 100 to 10–50, said (V), (I) and (II) being copolymerized with each other.

8. A composition of matter comprising copolymerized (V) butadiene and (II) a product liquid at 100° C. and selected from the group consisting of (a) monofurfurylidene-ketone, (b) difurfurylidene-ketone, (c) organic reaction masses produced by reacting under alkaline conditions furfuraldehyde and a ketone having two hydrogen atoms on an alpha carbon, said organic reaction masses having a viscosity of at least 50 cps. at 25° C., (d) residual fractions of (c) produced by the heat distillation of (c) and measuring at least 60% by weight of (c), and (e) polymerized products produced by polymerizing (a)–(d) under acidic conditions, the ratio by weight of (V) to (II) being 100 to 5–40.

9. The method comprising copolymerizing in the presence of an acidic catalyst (I) liquid styrene and (II) a product liquid at 100° C. and selected from the group consisting of (a) monofurfurylidene-ketone, (b) difurfurylidene-ketone, (c) organic reaction masses produced by reacting under alkaline conditions furfuraldehyde and a ketone having two hydrogen atoms on an alpha carbon, said organic reaction masses having a viscosity of at least 50 cps. at 25° C., (d) residual fractions of (c) produced by the heat distillation of (c) and measuring at least 60% by weight of (c), and (e) polymerized products produced by polymerizing (a)–(d) under acidic conditions, the ratio by weight of (I) to (II) being 100 parts of (I) to 5–100 parts of (II).

10. The method comprising copolymerizing in the presence of a peroxide catalyst (I) normally liquid styrene and (II) a product liquid at 100° C. and selected from the group consisting of (a) monofurfurylidene-ketone, (b) difurfurylidene-ketone, (c) organic reaction masses produced by reacting under alkaline conditions furfuraldehyde and a ketone having two hydrogen atoms on an alpha carbon, said organic reaction masses having a viscosity of at least 50 cps. at 25° C., (d) residual fractions of (c) produced by the heat distillation of (c) and measuring at least 60% by weight of (c), and (e) polymerized products produced by polymerizing (a)–(d) under acidic conditions, the ratio by weight of (II) to (I) being 100 parts of (II) to 5–100 parts of (I).

References Cited in the file of this patent

UNITED STATES PATENTS

| | | |
|---|---|---|
| 1,901,354 | Meisenburg | Mar. 14, 1933 |
| 1,937,063 | Meisenburg et al. | Nov. 28, 1933 |
| 2,469,788 | Rust | May 10, 1949 |